(12) United States Patent
Schmand et al.

(10) Patent No.: US 9,778,383 B2
(45) Date of Patent: Oct. 3, 2017

(54) TRANSMISSION OF PET-SIGNALS BY MEANS OF TIME DIVISION MULTIPLEXING

(71) Applicant: Siemens Medical Solutions USA, Inc., Malvern, PA (US)

(72) Inventors: Matthias J. Schmand, Lenoir City, TN (US); Ralph Oppelt, Uttenreuth (DE); Klaus Huber, Effeltrich (DE); Nan Zhang, Knoxville, TN (US)

(73) Assignees: Siemens Medical Solutions USA, Inc., Malvern, PA (US); Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 15/267,313

(22) Filed: Sep. 16, 2016

(65) Prior Publication Data

US 2017/0074996 A1    Mar. 16, 2017

Related U.S. Application Data

(60) Provisional application No. 62/219,218, filed on Sep. 16, 2015.

(51) Int. Cl.
*G01T 1/29* (2006.01)
*H04L 5/22* (2006.01)
*G01T 1/17* (2006.01)

(52) U.S. Cl.
CPC .............. *G01T 1/2985* (2013.01); *G01T 1/17* (2013.01); *H04L 5/22* (2013.01)

(58) Field of Classification Search
CPC ......... G01T 1/2985; G01T 1/248; G01T 1/17; A61B 6/037; H04L 5/22
See application file for complete search history.

(56) References Cited

U.S. PATENT DOCUMENTS

| | | |
|---|---|---|
| 7,205,924 B2 | 4/2007 | Vemulapalli et al. |
| 7,382,200 B2 | 6/2008 | Staszewski et al. |
| 7,498,890 B2 | 3/2009 | Wallberg et al. |
| 8,102,197 B1 | 1/2012 | Zhang et al. |
| 9,442,201 B2 | 9/2016 | Schmand et al. |
| 2010/0025589 A1* | 2/2010 | Olcott .................... G01T 1/1647 250/363.03 |
| 2011/0148490 A1 | 6/2011 | Lee et al. |
| 2015/0001399 A1* | 1/2015 | Fries ..................... G01T 1/2985 250/362 |

(Continued)

OTHER PUBLICATIONS

Andreev, V. et al., "A high-granularity scintillator calorimeter readout with silicon photomultipliers" Nuclear Instruments and Methods in Physics Research, A, 540 (2005), No. 2, pp. 368-380.

(Continued)

*Primary Examiner* — Marcus Taningco

(57) ABSTRACT

A nuclear imaging system includes a detector configured to detect at least one photon event. A timing signal path is electrically coupled to the detector. The timing signal path is configured to generate a timing signal indicative of a timing of the at least one photon event. An energy signal path is also electrically coupled to the detector. The energy signal path is configured to generate an energy signal indicative of an energy of the at least one photon event. A time-domain multiplexer is configured combine the timing signal and the energy signal into a compound signal.

16 Claims, 6 Drawing Sheets

(56) References Cited

U.S. PATENT DOCUMENTS

| | | | | |
|---|---|---|---|---|
| 2015/0001403 A1* | 1/2015 | Kim | ............ | G01T 1/2985 |
| | | | | 250/363.03 |
| 2015/0108328 A1* | 4/2015 | Guo | ............ | H04N 5/361 |
| | | | | 250/208.1 |
| 2015/0285922 A1* | 10/2015 | Mintzer | ............ | G01T 1/208 |
| | | | | 600/411 |
| 2016/0170045 A1* | 6/2016 | Kim | ............ | G01T 1/2018 |
| | | | | 250/208.1 |
| 2016/0231168 A1* | 8/2016 | Guo | ............ | G01J 1/4228 |

OTHER PUBLICATIONS

"ORTEC: Fast-Timing Discriminator Introduction", www.ortec-online.com, 9 pages.

Moses, William W., "Recent advances and future advances in time-of-flight PET" Nucl Instrum Methods Phys Res A. Oct. 1, 2007; 580(2): 919-924.

Zhang, Nan et al., "A pulse shape restore method for event localization in PET scintillation detection" Nuclear Science Symposium Conference Record, 2004 IEEE Bd. 7 IEEE, Oct. 2004, pp. 4084-4088.

Dongcang, Li et al. "A novel acquisition method for nuclear spectrum based on pulse area analysis" Chinese Physics C , vol. 39, No. 4, pp. 1-6.

\* cited by examiner

TRANSMISSION OF PET-SIGNALS BY MEANS OF TIME DIVISION MULTIPLEXING

CROSS-REFERENCE TO RELATED APPLICATION

This application claims priority under 35 U.S.C. §119(e) to U.S. Provisional Application Ser. No. 62/219,218 filed on Sep. 16, 2015, which is incorporated herein by reference in its entirety.

FIELD

Aspects of the present disclosure relate in general to detectors for nuclear imaging, and more particularly to signal transmission in nuclear imaging.

BACKGROUND

Nuclear imaging, such as positron emission tomography (PET), generates scintillation pulses based on receipt of positrons at photo detectors during imaging. The scintillation pulses are resolved in respect to time of origin and energy. Each scintillation signal is processed in two ways: timing information is resolved by providing the scintillation signal to a comparator and an analog-to-digital converter ADC or a time-to-digital converter TDC for the timing pickoff, and energy is resolved by a pulse shaper and an ADC for the energy integration. In some embodiments, timing information is provided by a mixed timing pickoff filter (MTP filter) which converts a step function of the comparator to a ramp function.

Current nuclear imaging systems split the original scintillation signal into two branches, a timing branch and an energy branch. Each of the branches is transmitted to a signal processing system on individual signal processing channels. Each of the individual signal processing channels require all respective passive and active components (including ADCs, time-to-digital converters, connectors, etc.) to be duplicated between the individual signal processing channels. The necessity of dual hardware processing channels increases the cost of the devices.

SUMMARY

In various embodiments, a nuclear imaging system is disclosed. The system includes a detector configured to detect at least one photon event. A timing signal processing path is electrically coupled to the detector. The timing signal processing path is configured to generate a timing signal indicative of a timing of the at least one photon event. An energy signal processing path is also electrically coupled to the detector. The energy signal path is configured to generate an energy signal indicative of an energy of the at least one photon event. A time-domain multiplexer is configured combine the timing signal and the energy signal into a compound signal.

In various embodiments, a PET imaging system is disclosed. The PET imaging system includes a gantry sized and configured to receive a patient and a scanner including at least one imaging modality configured to detect a plurality of photon events. The at least one imaging modality includes a plurality of detectors. Each of the detectors is coupled to a signal processing path. The signal processing path includes a timing signal path coupled to the detector and configured to generate a timing signal indicative of a timing of at least one of the plurality of photon events. The signal processing path further includes an energy signal path coupled to the detector and configured to generate an energy signal indicative of an energy of at least one of the plurality of photon events. A time-domain multiplexer is configured to combine the timing signal and the energy signal into a compound signal. A computer is in data communication with the signal processing path and is configured to receive the compound signal from the multiplexer.

In various embodiments, a nuclear imaging system is disclosed. The system includes a detector configured to detect at least one photon event, a timing signal path electrically coupled to the detector, and an energy signal path electrically coupled to the detector. The timing signal path is configured to generate a timing signal indicative of a timing of the at least one photon event. The timing signal path includes a comparator and a filter electrically coupled to the comparator. The energy signal path is configured to generate an energy signal indicative of an energy of the at least one photon event. The energy signal path includes an integrator and a delay line electrically coupled to the integrator. A time-domain multiplexer is configured to combine the timing signal and the energy signal into a compound signal. The multiplexer includes a summation amplifier.

BRIEF DESCRIPTION OF THE DRAWINGS

The following will be apparent from elements of the figures, which are provided for illustrative purposes and are not necessarily drawn to scale.

DETAILED DESCRIPTION

This description of the exemplary embodiments is intended to be read in connection with the accompanying drawings, which are to be considered part of the entire written description.

Various embodiments of the present disclosure address the foregoing challenges associated with signal transmission in nuclear imaging, such as PET imaging, for example, by multiplexing a timing signal and an energy signal into a digitized compound signal suitable for transmission over a single signal processing path. In some embodiments, a PET signal processing path includes a timing signal path and a separate energy signal path. The timing signal path generates a signal indicative of a timing of a detector event and is configured to optimize a noise-to-slope ratio (NSR). The energy signal path generates a signal indicative of an energy of the detector event and is configured to optimize a signal-to-noise ratio (SNR).

Figure 1:
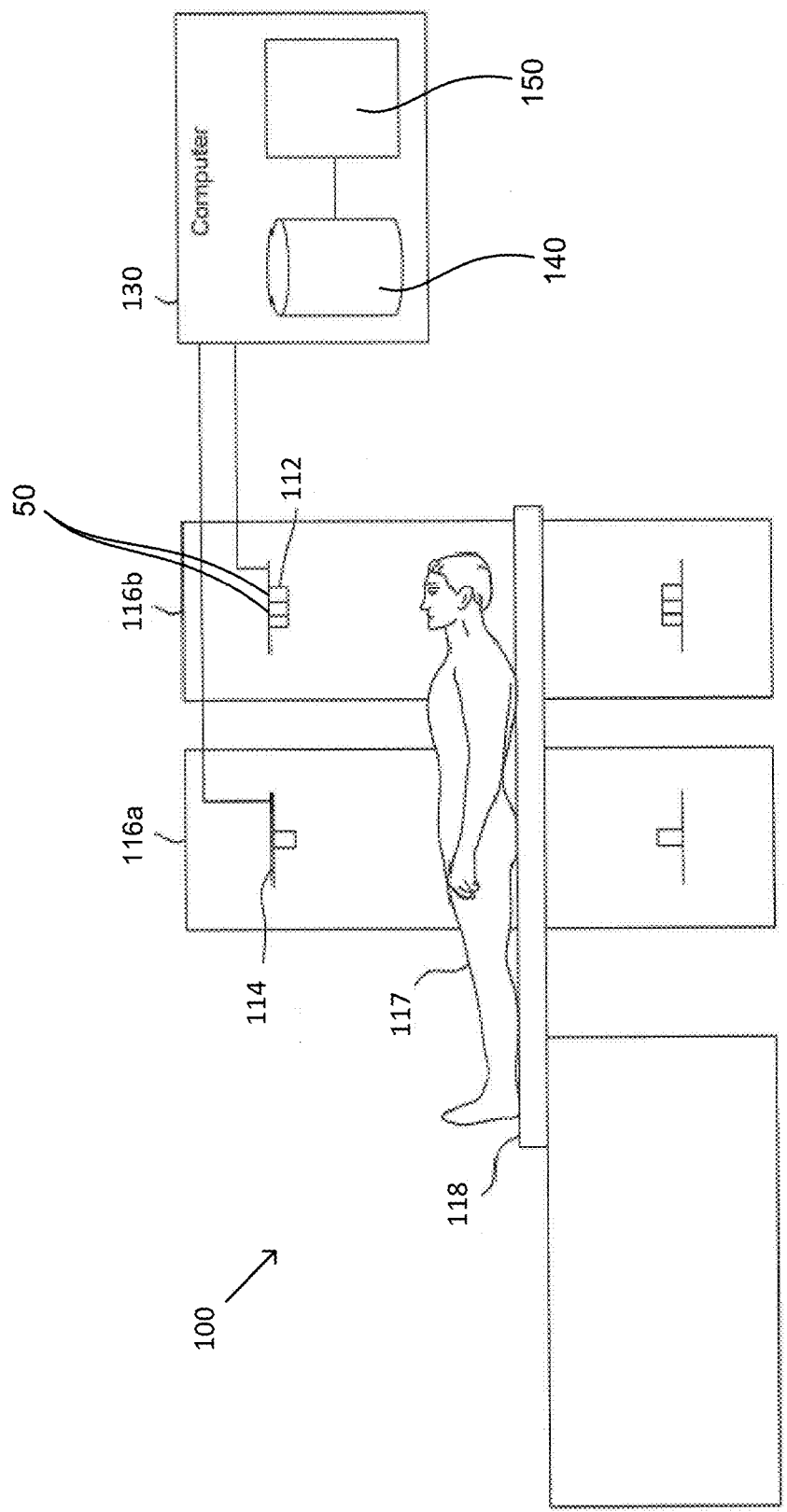
FIG. 1 illustrates a PET imaging system, in accordance with some embodiments.

FIG. 1 illustrates one embodiment of a nuclear imaging detector 100. The nuclear imaging detector 100 includes a scanner for at least a first modality 112 provided in a first gantry 116a. The first modality 112 includes a plurality of detectors 50 configured to detect an annihilation photon, gamma ray, and/or other nuclear imaging event. In various embodiments, the first modality 112 is a PET detector. A patient 117 lies on a movable patient bed 118 that may be movable between a gantry. In some embodiments, the nuclear imaging detector 100 includes a scanner for a second imaging modality 114 provided in a second gantry 116b. The second imaging modality 114 can be any suitable imaging modality, such as, for example, computerized tomography (CT), single-photon emission tomography (SPECT) and/or any other suitable imaging modality.

Scan data from the first modality 112 is stored at one or more computer databases 140 and processed by one or more computer processors 150 of a computer 130. The graphical depiction of computer 130 in FIG. 1 is provided by way of illustration only, and computer 130 may include one or more separate computing devices. The imaging data sets can be provided by the first modality 112 and/or may be provided as a separate data set, such as, for example, from a memory coupled to the computer 130. The computer 130 can include one or more processing electronics for processing a signal received from one of the plurality of detectors 50.

Figure 2:
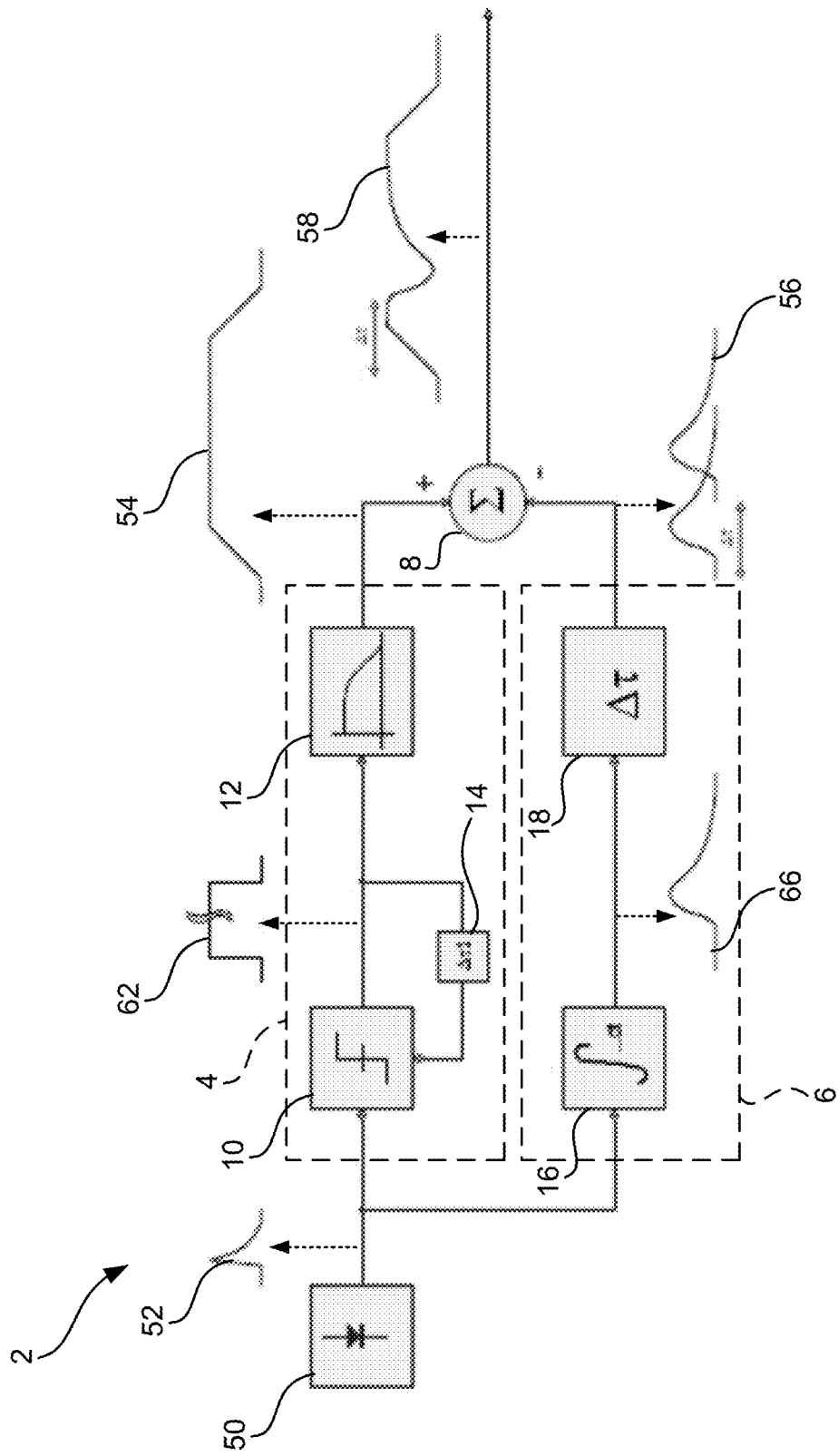
FIG. 2 illustrates a block diagram of a signal processing path of the PET imaging system of FIG. 1, in accordance with some embodiments.

FIG. 2 illustrates a block diagram of a signal processing path 2 of a PET detector frontend of the nuclear imaging detector 100 of FIG. 1. The signal processing path 2 is configured to transmit one or more elements of a detector signal from each of the plurality of detectors 50 to the computer 130. A detector 50 receives an imaging event (e.g., annihilation photon, gamma ray, etc.) and generates a signal output 52. The signal output 52 is split between a timing signal processing path 4 (e.g., a fast processing path) and an energy signal processing path 6 (e.g., a slow processing path) of the signal processing path 2. The output signal 52 is processed, independently, by each of the timing signal path 4 and the energy signal path 6. The timing signal path 4 generates a timing signal 54 and the energy signal path 6 generates an energy signal 56. A time-domain multiplexer 8 generates a digitized compound signal 58 by multiplexing (e.g., combining) the timing signal 54 and the energy signal 56, which can be transmitted over a single compound processing channel. The digitized compound signal 58 can be provided to one or more systems, such as the computer 130, for further processing and/or interpretation. The disclosed signal processing path is configured to provide enhanced timing performance for time-of-flight (TOF) Positron Emission Tomography (PET) and/or other nuclear imaging modalities.

In some embodiments, the timing signal path 4 includes one or more circuit elements configured to generate the timing signal 54. The timing signal 54 is a signal indicative of a timing of the detector output 52. In some embodiments, the timing path 54 includes a comparator 10 and a filter 12. The comparator 10 receives the detector signal 52 from the detector 50. The comparator 10 compares the detector signal 52 to a trigger-threshold to generate a deterministic logic pulse. In some embodiments, the comparator 10 is a flip-flop or D-type register and is reset by a delay circuit 14 configured to receive the deterministic logic pulse from the output of the comparator 10. When the voltage value of the detector signal 52 exceeds the trigger-threshold, the output of the comparator 10 is set to high. For example, at the start of a detector pulse 52, the output of the comparator 10 is zero, and the detector pulse 52 has a voltage greater than zero, causing the output of the comparator 10 to transition to high. The comparator 10 is reset by the delay circuit 14. If detector signal 52 has a voltage value less than the trigger-threshold, the comparator 10 output is maintained low. In some embodiments, the output of the comparator 10 is a self-resetting square wave 62 with a fixed pulse duration representing the timing of the detector 50. The leading edge of the square wave 62 indicates the start of a detector pulse and the falling edge of the square wave 62 can be configured to indicate the end of the detector pulse. In some embodiments, the pulse duration is a gated energy integration. Although specific outputs have been discussed herein, it will be appreciated that the output of the comparator 10 can be reversed (e.g., transitioning from high to low and low to high) and is within the scope of this disclosure.

In some embodiments, the timing path 4 includes a filter 12 configured to provide shaping of the square wave 62 generated by the comparator 10. In some embodiments, the filter 12 can be a low-pass filter, a band-pass filter, and/or a dedicated mixed-timing pickoff (MTP) filter, although it will be appreciated that any suitable filter may be used to shape the square wave 62. The filter 12 shapes the square wave 62 to generate a ramped timing signal 54 having a generally-trapezoidal shape. The timing signal 54 includes a rising edge 60a, a shelf portion 60b, and a falling edge 60c. The timing signal 54 is provided to first input of a multiplexer 8.

In some embodiments, the energy signal path 6 includes one or more circuit elements configure to generate the energy signal 56. For example, the energy signal path 6 can include an integrator 16 and a delay line 18. The integrator 14 is configured to integrate an area under the curve of the detector signal 52 and generate a first energy path signal 66. In order to avoid distortion of the composite signal 58 caused by providing energy information within the ramp of the timing signal 54, the first energy signal 66 is delayed. The first energy signal 66 is provided to the delay line 18 which delays the energy signal 66 by a predetermined amount, $\Delta t$, to generate a delayed energy signal 56. The delay $\Delta t$ is selected such that the time-domain multiplexer 8 multiplexes the energy signal 56 into the shelf portion 54b of the timing signal 54.

Each of the timing signal 54 and the energy signal 56 are provided to a time-domain multiplexer 8. The multiplexer 8 is configured to generate a composite signal 58 by time-multiplexing the timing signal 54 and the energy signal 56. In some embodiments, the multiplexer 8 is a summation time-domain multiplexer configured to add the timing signal 54 and the energy signal 56. One of the timing signal 54 or the energy signal 56 can be inverted prior to being combined by the multiplexer 8. Inversion of one of the timing signal 54 or the energy signal 56 allows the multiplexer 8 to generate a composite signal 58 with a known-maximum voltage value. For example, in some embodiments, the energy signal 56 is inverted prior to being combined with the timing signal 54. Inversion of the energy signal 56 results in the composite signal 58, which has a maximum voltage value equal to the voltage value of the shelf portion 54b of the timing signal 54. In other embodiments, the timing signal 54 can be inverted (see FIGS. 7A-7B). The composite signal 58 is provided to one or more signal processing systems, such as computer 130, for processing and extraction of timing and energy data, as discussed in more detail below with respect to FIGS. 7A-8.

Figure 3:
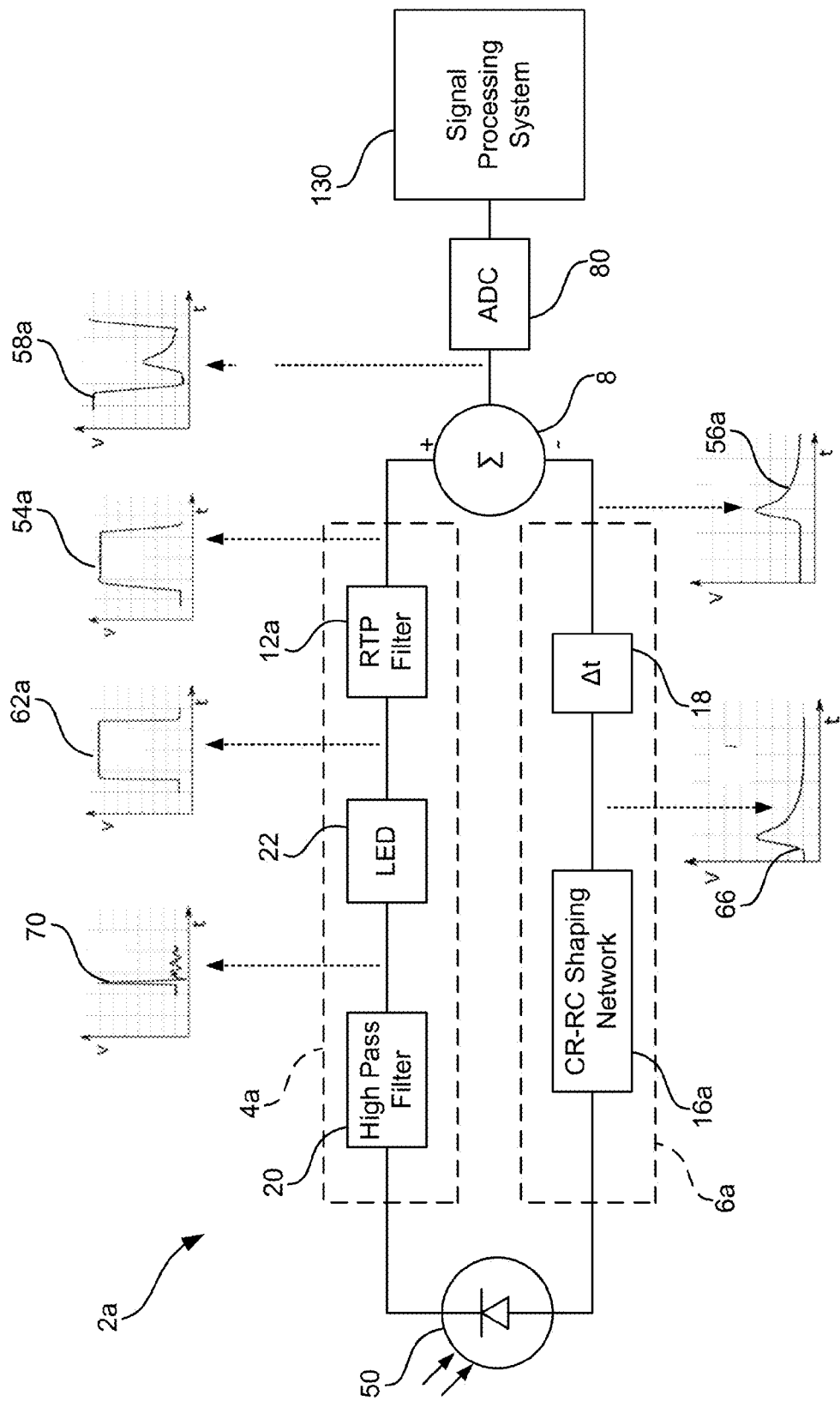
FIG. 3 illustrates a block diagram of a signal processing path of the PET imaging system of FIG. 1, in accordance with some other embodiments.

FIG. 3 illustrates a block diagram of another embodiment of a signal processing path 2a of the nuclear imaging detector 100 of FIG. 1. The signal processing path 2a is similar to the signal processing path 2 illustrated in FIG. 2, and similar description is not repeated. In some embodiments, the timing signal path 4a of the signal processing path 2a includes a high-pass filter 20, a leading edge discriminator 22, and a mixed-timing pickoff (MTP) filter 12a. The high-pass filter 20 and the leading edge discriminator 22 generate a square wave 62a indicative of the timing of a detector signal 52. For example, in some embodiments, the high-pass filter 20 provides pre-processing and shaping of the detector pulse 52 to generate a first timing path signal 70. The leading edge discriminator 22 generates a logic (e.g., digital) pulse (such as square wave 62a) in response to the first timing path signal 70. For example, when the first timing path signal 70 exceeds a predetermined threshold, the output of the leading edge discriminator 22 (e.g., square wave 62a) is set high and when the first timing path signal 70 drops below the predetermined threshold, the output is set low. The MTP filter 12a provides signal shaping similar to the MTP filter 12 of FIG. 2. For example, in some embodiments, the MTP filter 12a shapes the square-wave 62a to generate a ramped timing signal 54a having a generally-trapezoidal shape, as discussed above with respect to FIG. 2.

In some embodiments, the energy signal path 6a includes a CR-RC shaping network 16a. The CR-RC shaping network 16a is configured to generate a first energy signal 66a, similar to the integrator 14 discussed above with respect to FIG. 2. The CR-RC shaping network 14a can include a CR differentiator and an RC integrator configured to generate a first energy signal 66. The first energy signal 66a is provided to the delay circuit 16, which introduces the predetermined delay Δt, to generate an energy signal 56a.

In some embodiments, each of the timing signal 54a and the energy signal 56a are provided to a time-domain multiplexer 8. The multiplexer 8 can include any suitable multiplexer, such as, for example, a summation-based time-domain multiplexer. In some embodiments, the timing signal 54a is inverted prior to being combined with the energy signal 56a. Inversion of the timing signal 54a results in a composite signal 58a which has a maximum voltage value equal to zero, as discussed in more detail below with respect to FIGS. 7A-7B.

Figure 4:
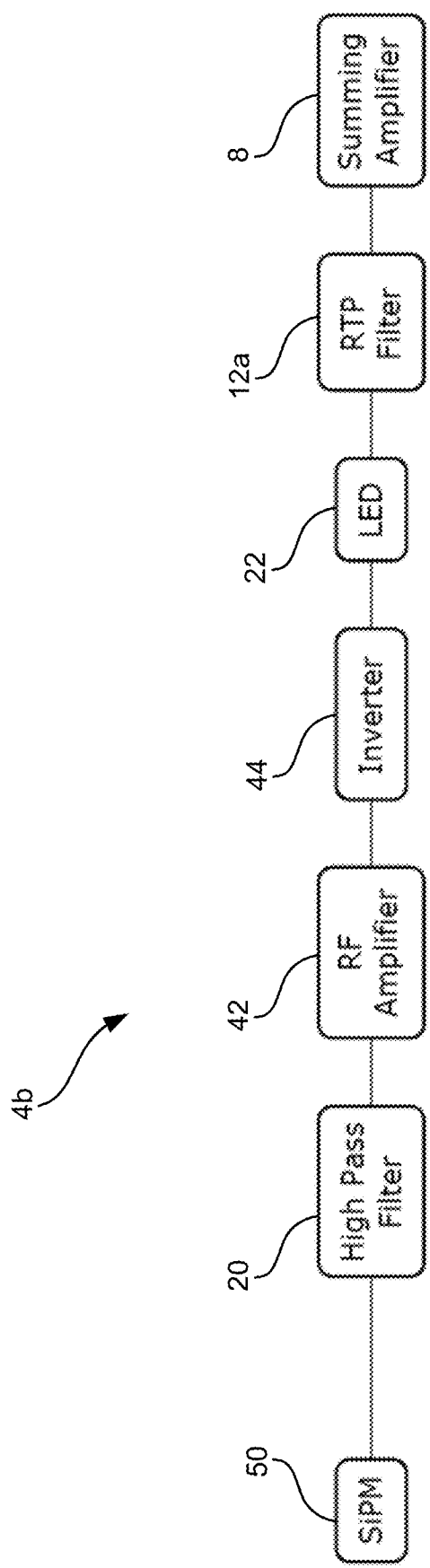
FIG. 4 illustrates a block diagram of a timing path of the signal processing path of the PET imaging system of FIG. 1, in accordance with some embodiments.

FIG. 4 illustrates an alternative timing signal path 4b, in accordance with some embodiments. The timing signal path 4b is similar to the timing signal path 4a discussed above with respect to FIG. 3, and similar description is not repeated herein. The timing signal path 4b includes a high-pass filter 20, an RF amplifier 42, and an inverter 44 configured to shape a detector pulse 52 received from a cathode of the detector 50. The shaped signal is provided to the leading edge discriminator 22 to generate a square wave. The square wave is further processed by the MTP filter 12a prior to being provided to a multiplexer 8 for multiplexing with an energy signal 56 received from an energy signal path 6, 6a. The timing signal path 4b generates a timing signal that is an inverted version of the timing signal 54a generated by the timing signal path 4a illustrated in FIG. 3.

Figure 5A:
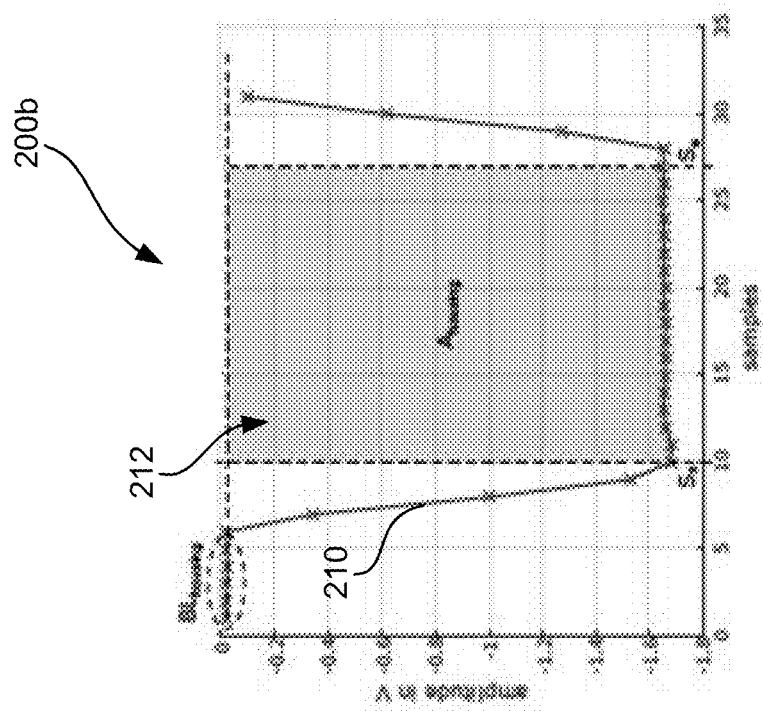
FIGS. 5A and 5B are graphs illustrating signal processing of a digitized compound signal generated by the PET imaging system of FIG. 1, in accordance with some embodiments.
Figure 5B:
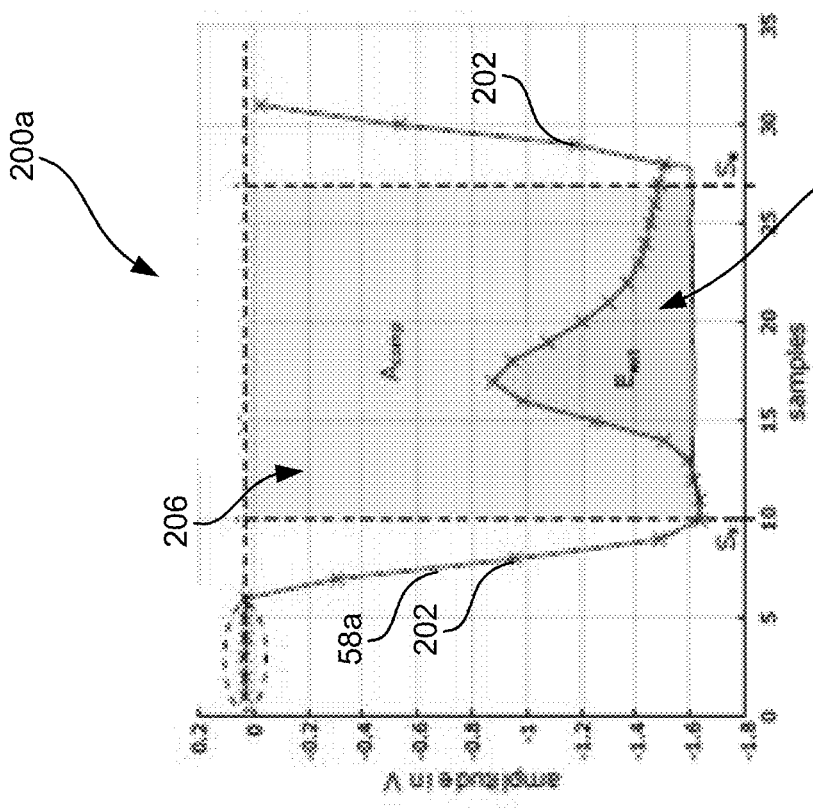
Figure 5C:
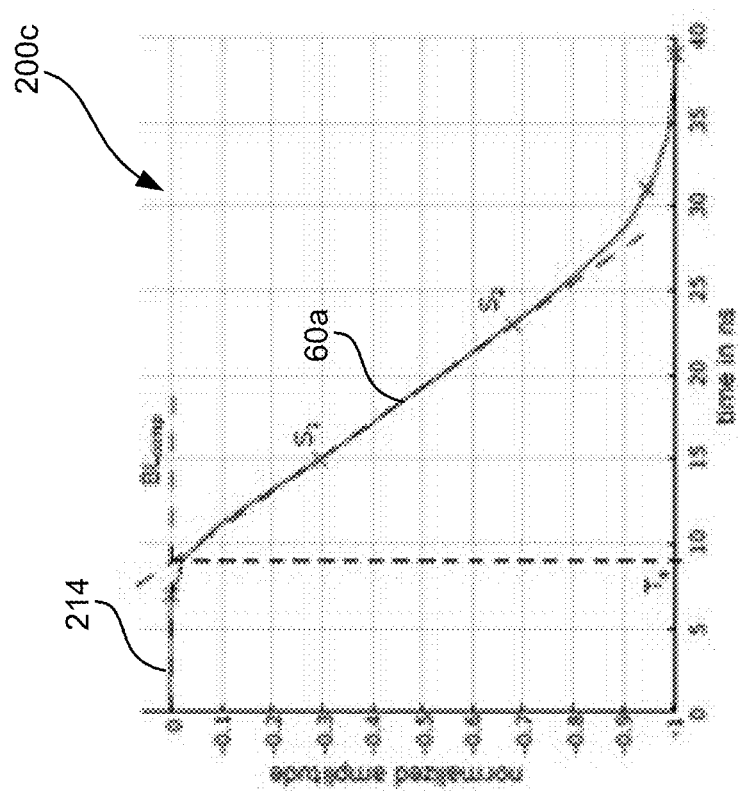
FIG. 5C is a graph illustrating a leading ramp portion of a digitized compound signal generated by the PET imaging system of FIG. 1, in accordance with some embodiments.

FIGS. 5A-5C are graphs 200a, 200b, 200c illustrating a composite signal 58a generated by the signal processing path 2a of FIG. 3. The composite signal 58a includes an inverted timing signal 54a and an energy signal 56a. The energy signal 56a is combined with the inverted timing signal 54a at a shelf portion 60b of the inverted timing signal 54a. In some embodiments, the energy information can be extracted from the composite signal through a variation of pulse area analysis.

FIG. 5A illustrates a finite sampling rate of the composite signal. Each digital sample is illustrated as a sample mark 202. The energy information of the detected photon is included in an energy portion 204, referred to herein as $E_{ext}$. The area of $E_{ext}$ 204 cannot be directly measured during signal processing. However, a composite area 206 ($A_{comp}$) can be measured. The area of $E_{ext}$ 204 can be determined by determining the difference of $A_{comp}$ 206 and an area of the composite signal 58a without the energy information.

FIG. 5B illustrates one embodiment a housing signal 210, i.e., the composite signal 58a with the energy information removed. The housing signal 210 is configured to encase the energy signal component of the signal. The housing signal 210 includes a housing area 212 ($A_{housing}$). The housing area is defined by an area under the curve of the housing signal 210 between a start sample Ss corresponding to a start of the energy information in the composite signal 58a and an end sample $S_e$ corresponding to an end of the energy information in the composite signal 58a. The area of $E_{ext}$ 204 can be determined by the difference between the housing area 212 and the composite area 206, according to the equation:

$$E_{ext} = |A_{housing} - A_{comp}| \qquad \text{Equation 2}$$

Equation 2 assumes that the baseline of each of the housing area 212 and the composite area 206 is constant. In operation, the baseline does not remain constant and must be compensated for. The unipolarity of the detector pulses 52 and AC coupled circuits for readout result in baseline shift, which results in a changing baseline value depending on the statistical occurrence of the detector pulse. The baseline shift can be accounted for according to the equations:

$$A_{comp} = \Sigma_{n=S_s}^{S_e}(s_{comp}[n] = BL_{comp}) \qquad \text{Equation 3}$$

$$A_{housing} = \Sigma_{n=S_s}^{S_e}(s_{housing}[n] - BL_{housing}) \qquad \text{Equation 4}$$

where $s_{comp}$ is the compound signal 58a, $BL_{comp}$ is a baseline of the multiplexed signal 58a, $s_{housing}$ is the housing signal 210, and $BL_{housing}$ is the baseline of the housing signal.

FIG. 5C illustrates a ramp section 60a of the compound signal 58a, in accordance with some embodiments. The timing information of the compound signal 58a can be extracted from the ramp section 60a. For example, in some embodiments, a first sample $S_1$ and a second sample $S_2$ of the compound signal 58a are used to define an extrapolated slope $f_{eps}$ of the ramp section 60a, according to the equation:

$$f_{eps} = \left(\frac{s_{comp}[S_2] - s_{comp}[S_1]}{t_{s_2} - t_{s_1}} x\right) - \left(\frac{s_{comp}[S_2] - s_{comp}[S_1]}{t_{s_2} - t_{s_1}} t_{s_2} + s_{comp}[S_1]\right) \qquad \text{Equation 5}$$

where $s_{comp}$ is the compound signal 58a and $t_{si}$ refers to the time value of the sample $S_i$. An intersection point between the compound signal 58a and the baseline 214 indicates the time stamp $T_s$ (i.e., the start of the detector pulse 52), indicated by the equation:

$$T_s = \frac{BL_{comp} - b}{m} \qquad \text{Equation 6}$$

where the baseline value $BL_{comp}$ is the average of a certain number of samples in front of the slope of the compound signal, m is equal to the first parenthetical term of Equation 5, and b is equal to the second parenthetical term of Equation 5.

In some embodiments, a shift of the baseline value is fixed by a constant value $BL_{off}$. $BL_{off}$ can be set approximately to the arithmetic middle of $S_1$ and $S_2$ and kept at a constant value. By linear interpolation of $S_1$ and $S_2$ and intersection with the new baseline, the time stamp $T_s$ can be determined by the equation:

$$T_s = \frac{BL_{comp} + BL_{off} - b}{m} \quad \text{Equation 7}$$

The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein may be applied to other embodiments without the use of inventive faculty. The present disclosure is not intended to be limited to the embodiments shown herein, but is to be accorded the widest scope consistent with the principles and novel features disclosed herein.

What is claimed is:

1. A nuclear imaging system, comprising:
   a detector configured to detect at least one photon event;
   a timing signal path electrically coupled to the detector and configured to generate a timing signal indicative of a timing of the at least one photon event;
   an energy signal path electrically coupled to the detector and configured to generate an energy signal indicative of an energy of the at least one photon event; and
   a time-domain multiplexer configured combine the timing signal and the energy signal into a compound signal,
   wherein the timing signal path comprises:
      a comparator; and
      a filter electrically coupled to the comparator
         wherein the filter comprises a mixed timing pickoff (MTP) filter.

2. The system of claim 1, wherein a first input of the comparator is configured to receive a signal from the detector and a second input of the comparator is configured to receive a delayed output of the comparator.

3. The system of claim 1, wherein the comparator comprises a high pass filter and a leading edge discriminator.

4. The system of claim 1, wherein the timing signal path comprises an inverter electrically coupled between the comparator and the filter.

5. The system of claim 1, wherein the energy signal path comprises:
   an integrator; and
   a delay line electrically coupled to the integrator.

6. The system of claim 5, wherein the integrator comprises a CR-RC shaping network.

7. The system of claim 6, wherein the CR-RC shaping network comprises a CR differentiator and an RC integrator.

8. The system of claim 7, wherein a time constant of the CR differentiator is equal to a time constant of the RC integrator.

9. The system of claim 5, comprising an inverter electrically coupled to the delay line.

10. The system of claim 1, wherein the multiplexer comprises a summation amplifier.

11. A positron emission topography (PET) imaging system, comprising:
   a gantry sized and configured to receive a patient;
   a scanner including at least one imaging modality configured to detect a plurality of photon events, the at least one imaging modality comprising a plurality of detectors, wherein each of the detectors is coupled to a signal processing path comprising:
      a timing signal path coupled to the detector and configured to generate a timing signal indicative of a timing of at least one of the plurality of photon events;
      an energy signal path coupled to the detector and configured to generate an energy signal indicative of an energy of at least one of the plurality of photon events; and
      a time-domain multiplexer configured combine the timing signal and the energy signal into a compound signal; and
   a computer in data communication with the signal processing path and configured to receive the compound signal from the time-domain multiplexer,
   wherein the timing signal path comprises:
      a comparator; and
      a filter electrically coupled to the comparator, and
      wherein the filter comprises a mixed timing pickoff (MTP) filter.

12. The system of claim 11, wherein the timing signal path comprises an inverter electrically coupled between the comparator and the filter.

13. The system of claim 11, wherein the energy signal path comprises:
   an integrator; and
   a delay line electrically coupled to the integrator.

14. The system of claim 13, wherein the integrator comprises a CR-RC shaping network.

15. The system of claim 13, comprising an inverter electrically coupled to the delay line.

16. A nuclear imaging system, comprising:
   a detector configured to detect at least one photon event;
   a timing signal path coupled to the detector and configured to generate a timing signal indicative of a timing of the at least one photon event, wherein the timing signal path comprises:
      a comparator; and
      a filter electrically coupled to the comparator, wherein the filter comprises a mixed timing pickoff (MTP) filter;
   an energy signal path coupled to the detector and configured to generate an energy signal indicative of an energy of the at least one photon event, wherein the energy signal path comprises:
      an integrator; and
      a delay line electrically coupled to the integrator; and
   a time-domain multiplexer configured to combine the timing signal and the energy signal into a compound signal, the multiplexer comprising a summation amplifier.

* * * * *